(12) United States Patent
Aubert

(10) Patent No.: US 9,841,308 B2
(45) Date of Patent: Dec. 12, 2017

(54) DETECTION OF WATER IN A TENSIONING BUOY

(71) Applicant: TOTAL S.A., Courbevoie (FR)

(72) Inventor: Jean-Michel Aubert, Vaires sur Marne (FR)

(73) Assignee: Total S.A., Courbevoie (FR)

( * ) Notice: Subject to any disclaimer, the term of this patent is extended or adjusted under 35 U.S.C. 154(b) by 0 days.

(21) Appl. No.: 15/115,456

(22) PCT Filed: Feb. 4, 2014

(86) PCT No.: PCT/FR2014/050196
§ 371 (c)(1),
(2) Date: Jul. 29, 2016

(87) PCT Pub. No.: WO2015/118230
PCT Pub. Date: Aug. 13, 2015

(65) Prior Publication Data
US 2017/0167910 A1   Jun. 15, 2017

(51) Int. Cl.
*G01S 15/00* (2006.01)
*G01F 23/296* (2006.01)
*E21B 17/01* (2006.01)
*E21B 47/00* (2012.01)

(52) U.S. Cl.
CPC .......... *G01F 23/296* (2013.01); *E21B 17/012* (2013.01); *E21B 47/0001* (2013.01)

(58) Field of Classification Search
CPC ... G01F 23/296; E21B 17/012; E21B 47/0001
USPC ...................................................... 367/87, 93
See application file for complete search history.

(56) References Cited

U.S. PATENT DOCUMENTS

| 3,855,656 | A | * | 12/1974 | Blenkarn | ................ B63B 22/18 114/267 |
| 4,459,853 | A | * | 7/1984 | Miwa | .................. G01S 7/52079 73/626 |
| 4,523,122 | A | * | 6/1985 | Tone | ...................... G10K 11/02 310/327 |
| 4,524,609 | A | * | 6/1985 | Sharp | ................... B65D 90/503 220/723 |
| 6,820,008 | B1 | * | 11/2004 | van Smirren | ........... G01S 15/58 367/90 |
| 8,136,599 | B2 | * | 3/2012 | Alliot | .................... E21B 17/015 166/345 |

(Continued)

FOREIGN PATENT DOCUMENTS

| GB | 2281622 | A | * | 3/1995 | ......... G01F 23/2962 |
| WO | WO 2014016801 | A2 | * | 1/2014 | ......... G01F 25/0061 |

*Primary Examiner* — Eric M Blount
(74) *Attorney, Agent, or Firm* — Harness, Dickey & Pierce, PLC

(57) ABSTRACT

The disclosure relates to a method for detecting water in a tensioning buoy of a riser column of an installation located in an aquatic environment, the method including, in succession, steps of: defining a representative standard echo; emitting the ultrasonic signal on a wall of the buoy; measuring a representative response echo due to the reflection of the ultrasonic signal in the buoy; comparing the representative response echo to the representative standard echo; and determining whether water is present in or absent from the buoy from the comparison.

9 Claims, 2 Drawing Sheets

(56) References Cited

U.S. PATENT DOCUMENTS

2015/0246711 A1* 9/2015 Lee .................. B63B 21/50
  405/224
2015/0276463 A1 10/2015 Milne et al.

* cited by examiner

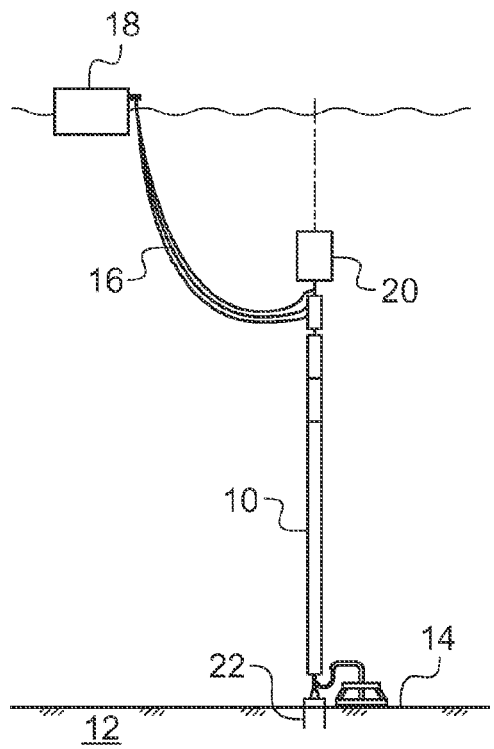
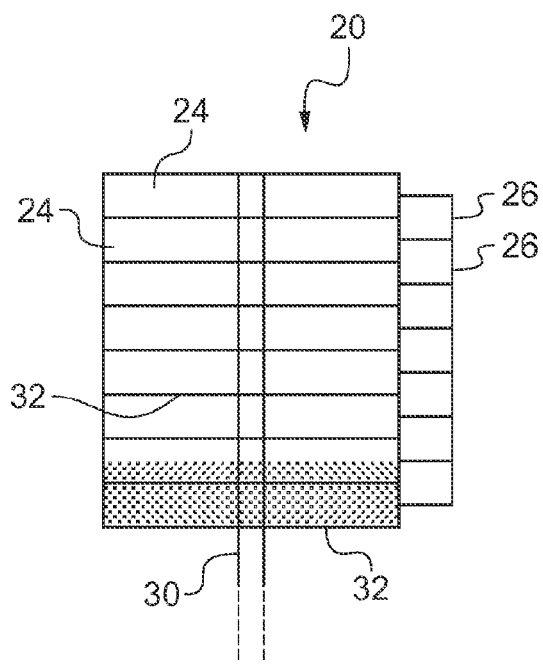
Fig.1
Fig.2
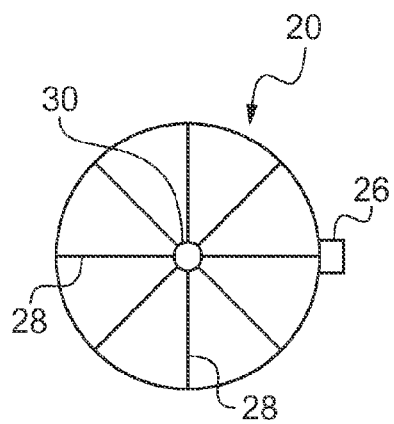
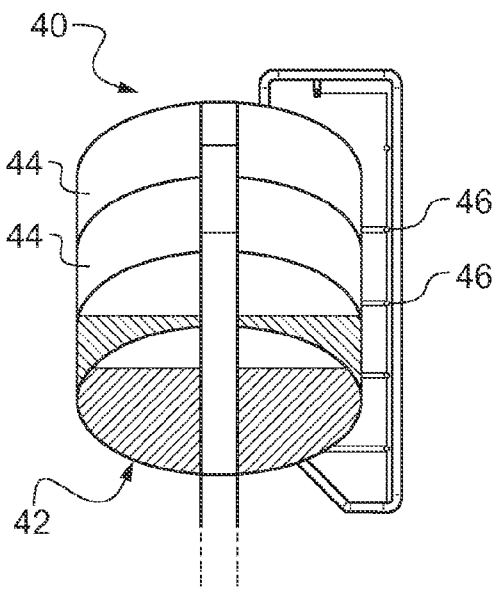
Fig.3
Fig.4

DETECTION OF WATER IN A TENSIONING BUOY

CROSS-REFERENCE TO RELATED APPLICATIONS

This application is a National Phase Entry of International Patent Application No. PCT/FR2014/050196, filed on Feb. 4, 2014, which is incorporated by reference herein.

BACKGROUND AND SUMMARY

The present invention relates to a method and to an apparatus for detecting the presence of water in a riser tensioning buoy in marine environment installations.

FIG. 1 shows an example of a known riser 10, implemented in a marine environment oil extraction installation. The riser 10 is typically employed for carrying, in a substantially vertical direction, oil products derived from one or more wells drilled in the seabed 12 to a surface structure, for example up to a floating base 18 for production, storage and loading (or FPSO "Floating production storage and offloading"). Hydrocarbons, once extracted from the wells, first pass through a network of ducts 14 which extend on the surface of the seabed between the wells and the lower end of the riser 10. Each duct connects one or more wells to the lower end of the riser 10.

The set of ducts are grouped together in the riser 10 and discharge at the upper end of the riser. Flexible pipes 16 running from the upper end of the riser 10 link the ducts 14 to the surface structure 18 where the hydrocarbons produced can be stored. The riser 10 and the pipes 16 can also be used in the opposite direction in order to, for example, convey water or gas from the floating base to the bottom.

The riser 10 may typically have a length of the order of a few kilometers. As a consequence, regardless of the material used to make the riser 10, the latter has a tendency to buckle. Moreover, this tendency can be accentuated by ocean currents. Also, in order to maintain riser 10 in the vertical position, it is known to associate it with a tensioning buoy 20, said riser being fastened to the seabed, at its lower end by means of an anchor 22.

Tensioning buoy 20 is generally a metal structure containing air in order to establish, thanks to buoyancy forces, an upward tension on riser 10, ensuring retention thereof in a vertical position and limiting buckling. FIGS. 2 and 3 show a known type of tensioning buoy. Tensioning buoy 20 is comprised of flat-bottomed 32 cylindrical chambers 24 fixed to each other and communicating with each other through valves 26. Each cylindrical chamber 24 has reinforcing members 28 on its upper and lower surfaces. In addition, a tube 30, designed to be rendered integral with the riser, passes through all the chambers 24 in order to distribute the forces exerted by the riser on tensioning buoy 20.

In a variant shown in FIG. 4, the tensioning buoy 40 includes cylindrical chambers 44 with a rounded bottom 42 attached to each other and communicating with each other through valves 46. The purpose of the rounded bottoms 42 is to improve mechanical strength compared to flat-bottomed chambers.

Tensioning buoys which remain permanently in a marine environment are subject to corrosion that can cause leaks in their chambers and thus render a tensioning buoy inoperative. Tensioning buoys are regularly inspected by a robot submarine to determine whether they are leaking and/or are partially filled with water. To do this, it is known to place a radioactive source on one side of the tensioning buoy and a radiation sensor opposite the source, at the other side of the buoy. Since water acts as a screen to radiation, the presence of water is determined when the level of radiation sensed falls below a predetermined threshold.

Although relatively reliable, this known method requires the use of a radioactive source, which presents obvious security and safety hazards. In addition, it is difficult to obtain such a radioactive source and import it to the place of use. Finally, depending on the geometry of the tensioning buoy, it may be difficult to determine the above threshold.

Furthermore, it is known to monitor the integrity of the structure of an offshore platform made of cylindrical steel tubes, by making use of an ultrasound transducer (or sensor/transmitter) placed on one of said tubes. More specifically, the transducer, placed against a wall of the tube, transmits ultrasound waves that propagate extremely well in water but almost not at all in air, and then measures echoes of the waves reflected by the wall of said tube opposite to the wall against which the transducer is placed.

This method is effective in the case of a structure of an offshore platform comprising cylindrical tubes of limited size but it is difficult to transpose the method to tensioning buoys. As FIGS. 2 and 3 show, the tensioning buoy 20 does indeed have a central tube 30 which tends to spread an incident ultrasound wave in diverging directions. It then becomes extremely difficult if not impossible to measure the echo of the ultrasound waves reflected from this tube and/or by the opposite wall. Moreover, given the diameters of buoys of this type, parallelism tolerances which are necessary for proper return of the ultrasound wave to the sensor are hardly compatible with conventional tolerances applying to such products from the boiler-making industry.

Furthermore, the two known processes described above are difficult to apply, or even inapplicable, for detecting water in a buoy having:
  a diameter greater than four meters,
  round-bottomed chambers.

There is therefore a real need for a method and apparatus which are easy to implement, making it possible to accurately determine the presence or absence of water in a tensioning buoy. To this end, the present invention provides a method for detecting water in a riser tensioning buoy in installations in a marine environment, said method being characterized in that it comprises the successive steps of:
  defining a representative standard echo
  transmitting said ultrasound signal onto a wall of said buoy,
  measuring a representative response echo resulting from rebound of the said ultrasound signal within said buoy,
  comparing said representative response echo with said representative standard echo,
  determining the presence or absence of water in the buoy depending on the results of said comparison.

According to particular features, comparison of the representative response echo with the representative standard echo consists in calculating their difference in amplitude. According to particular features, determining the presence or absence of water in the buoy consists in comparing a calculated difference in amplitude with a predefined threshold, and
  if said difference in amplitude does not exceed said threshold, concluding that the buoy does not contain water, or
  if said difference in amplitude exceeds said threshold, concluding that the buoy does contain water.

According to particular features, the threshold is 5 dB.

Thanks to these provisions, one can eliminate potential uncertainties arising notably from noise and the conditions of under which the method according to the invention is implemented. According to particular features, the step of defining the representative standard echo notably comprises:

transmitting an ultrasound signal to a wall of a benchmark buoy filled with water, at a given location of said wall, then measuring a first series of standard echoes, and transmitting the same ultrasound signal to the wall of said benchmark buoy filled with air at the same location on said wall, then measuring a second series of standard echoes, then calculating the difference between each standard echo in the first series and each corresponding standard echo of the second series, then selecting a pair of standard echoes having the largest difference, selecting one of the two echoes of said pair of standard echoes.

According to particular features, selection of the pair of standard echoes having the greatest difference is performed on pairs of standard echoes beyond the second one and below the twenty-first one. According to particular features, the step of defining a representative standard echo is performed using numerical simulation and/or testing on a representative model. According to particular features, the step of measuring representative response echo comprises notably:

measuring a series of response echoes, then selecting the response echo corresponding to the selected representative standard echo.

According to particular features, the transmission of ultrasound signals and the echo measurements are performed by means of a transducer.

The invention also provides apparatus for detecting water in a buoy for tensioning a riser of a marine installation, said apparatus comprising:

a human-machine interface an ultrasound transducer applied to a wall of said buoy, said transducer transmitting an ultrasound signal and measuring a representative response echo caused by rebound of said signal within said buoy, a data memory that stores a predetermined representative standard echo and a representative response echo measured by the transducer, a program memory comprising:

a program for transmitting the said ultrasound signal, a program for measuring said response echo, a program for comparing an amplitude of the representative response echo with the representative standard echo a program for determining the presence or absence of water in the buoy dependent on the result of said comparison, a computer for controlling said human-machine interface, said transducer and said data and program memories.

Other features and advantages of the invention will appear on reading the following description of a preferred embodiment of the invention, given by way of example and with reference to the accompanying drawings.

BRIEF DESCRIPTION OF THE DRAWINGS

FIG. 1, already described, schematically shows an example of a riser of a hydrocarbon production installation in a marine environment;

FIGS. 2 and 3, already described, schematically show, respectively in front view and top view, a known example of a flat-bottomed tensioning buoy;

FIG. 4, already described, schematically shows a front view of a known example of a round-bottomed tensioning buoy;

DETAILED DESCRIPTION

Figure 5:
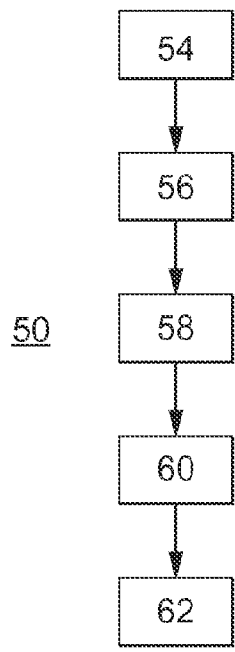
FIG. 5 shows, in the form of a flowchart, one embodiment of a water detection method according to the invention.

The method 50 for detecting water in a riser of an installation operating in a marine environment according to the invention essentially comprises the following steps. In the example, we consider the case of an oil extraction installation in a marine environment similar to that shown in FIG. 1. First, we define (54) a standard representative echo $EE_{11}$. This representative standard echo $EE_{11}$ can be defined by numerical simulation and/or obtained from testing on a representative model. More specifically, in the case of tests carried out on a model, this definition (54) of the standard echo $EE_{11}$ consists in initially transmitting an ultrasound signal onto a wall of a benchmark buoy filled with water, at a given location on said wall, and then measuring a first series of standard echoes EE.

Next, the same ultrasound signal is transmitted onto the wall of said benchmark buoy this time filled with air at the same location on said wall, after which a second series of standard echoes is measured. Next, we calculate the difference between each standard echo in the first series and each corresponding standard echo of the second series, and the pair of standard echoes having the largest difference is selected, after which a standard echo $EE_{11}$ from among the two echoes of said pair of standard echoes is selected. In the case of numerical simulation, transmissions of ultrasound signals are virtual and measurements are evaluations. In the example shown, the representative standard echo $EE_{11}$ is the eleventh standard echo measured for a water-filled buoy.

The rank of the pair of standard echoes having the largest difference depends on the conditions under which the ultrasound signal was transmitted and the echoes measured, as well as on the thickness, geometry and condition of the wall of the benchmark buoy. Representative standard echoes can be defined for different chambers of the benchmark buoy the state of which (i.e. whether it contains water or not) is known since it is known to at least partially fill one or more chambers of a tensioning buoy, in order to serve as a reserve tensioning force. As the state of these chambers is known, it is possible to compare the representative standard echo from one chamber with the representative echo from another chamber, or more generally with other locations on the benchmark buoy, in order to increase the accuracy of water detection.

The next step 50 in the detection method according to the invention consists in transmitting (56) by means of an ultrasound transmitter 86 applied to a wall of a tensioning buoy to be tested, an ultrasound signal. Next, measurement is performed (58) of the representative response echo $ER_{11}$ resulting from rebound of the ultrasound signal within the tensioning buoy to be tested. In a preferred embodiment of the method according to the invention, the step (58) of measuring the representative response echo $ER_{11}$ includes measuring a series of response echoes ER, then selecting the one corresponding to the representative standard echo $EE_{11}$.

Figure 7:
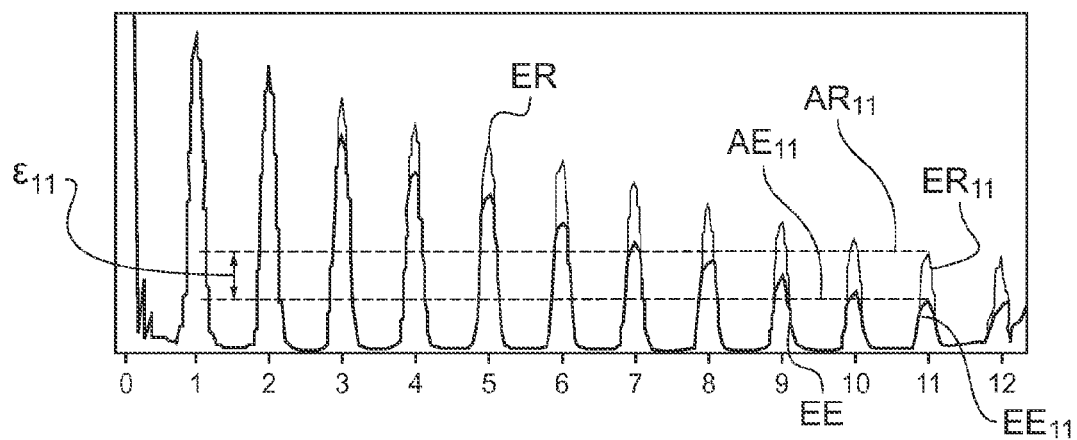
FIG. 7 shows, in the form of a graph, an example of a comparison between standard echoes and response echoes caused by the reflections of an ultrasound signal on a wall of a tensioning buoy.

Typically, the number of response echoes ER is the same as the number of standard echoes EE. In the example shown in FIG. 7, there are twelve response echoes RE and twelve standard echoes EE. Measurement (58) of response echoes ER is a measurement carried out for example by means of an ultrasound receiver 86 applied to a wall of the tensioning buoy to be tested.

To do this, the ultrasound receiver is preferably placed at substantially the same location as the ultrasound transmitter. This is in particular possible in the case where an ultrasound transducer 86 (that is to say, an ultrasound transmitter/receiver) is implemented for both the transmission 56 of the ultrasound signal and for the measurement (58) of response echoes ER. Such a transducer 86 transmits compression waves with a frequency of between 0.2 MHz and 20 MHz. Coupling of the transducer 86 to the metal of the buoy is provided by the sea water or by means of an additional coupling medium.

Echoes are formed by successive reflections of the ultrasound signal at the various interfaces (that is to say changes in material) encountered on its path of propagation. Thus, a first reflection of the ultrasound signal occurs at the interface between the layer of paint on the wall against which the transmitter is firmly held and the metal structure of the tensioning buoy. This first echo may itself be reflected at the interface between the paint and the ultrasound receiver. A second echo originates from reflection of the ultrasound signal at the interface between the metal structure of the tensioning buoy and the inside of the tensioning buoy, which can, a priori, be either air, or water if the tensioning buoy is leaking.

Returning to the example above, reflection of the ultrasound signal is substantially total at a steel/air interface, and in all cases, significantly higher than the reflection of the ultrasound signal at a steel/water interface. Thus, it can be understood that the response echoes ER from the same ultrasound signal are influenced by the presence or absence of water in the tensioning buoy. In particular, echoes are more pronounced in the absence of water in the tensioning buoy on the propagation path of the ultrasound signal than in the presence of water.

It may also be noted that the velocity of propagation of an ultrasound signal is greater in water than in air. Thus, the presence of water in a tensioning buoy can cause an offset in the response echoes ER of an ultrasound signal compared to the same echoes in the absence of water. The offset nevertheless remains minimal and is therefore determinable with difficulty.

The method 50 continues by comparing (60) the representative response echo ER11 with the representative standard echo EE11. Preferably, this comparison (60) consists in calculating a difference ϵ11 between the amplitude $AE_{11}$ of the representative standard echo $EE_{11}$ and amplitude $AR_{11}$. In addition, as mentioned above, the first measured echoes can come from reflection of the ultrasound signal at the paint/steel interface (and from successive reflections of the thus reflected signal). Therefore, to improve the accuracy of detection of water in the tensioning buoy, provision is made not to take account of the first echoes measured, for example, the first two echoes.

Figure 6:
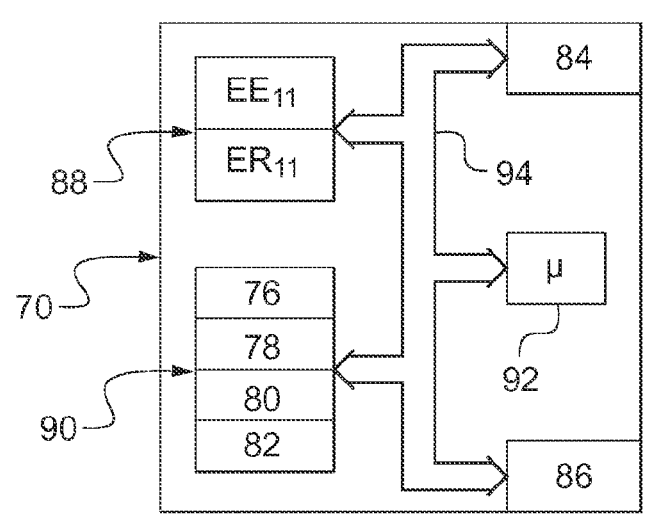
FIG. 6 schematically shows an embodiment of water detection apparatus according to the invention.

In a substantially similar manner, very high order echoes (e.g. beyond the twentieth) may be not representative because of the many successive reflections which have occurred in the tensioning buoy and which generate a flattening of the signal due notably to the non-zero size of the ultrasound transducer and to the roughness of the surfaces involved. This is the reason why, in order to improve the accuracy of the comparison step 60, particular attention will be paid to echoes which are beyond the second one and below the twenty-first one. In the example shown in FIG. 6, we are interested in echoes from the third one up to and including the eleventh.

Finally, we can determine (62), depending on the comparison (60), if water is present or not in the tensioning buoy and therefore deduce if the tensioning buoy is or is not leaking. Preferably, the determining step (62) consists in comparing the difference in calculated amplitude $\epsilon_{11}$ with a predefined threshold, preferably of the order of 5 dB. Having set this threshold, if said difference in amplitude does not exceed said threshold, it is concluded that the buoy does not contain water and if said difference in amplitude does exceed said threshold, it is concluded that the buoy does contain water.

The apparatus 70 adapted to implement the method 50 of the invention includes a human-machine interface 84, an ultrasound transducer 86, a data memory 88, a program memory 90 and a computer 92 controlling said human-machine interface, said transducer and said data and program memories. Typically these elements of apparatus 70 according to the invention are interconnected by a CAN (Controller Area Network) type bus.

The ultrasound transducer 86 is applied to a wall of the buoy to be tested and, transmits, 56, an ultrasound signal and measures, 58, the representative response echo $ER_{11}$ caused by rebounding of said ultrasound signal within said buoy. The predefined representative standard echo $EE_{11}$ and the representative response echo $ER_{11}$ measured by the transducer 86 are stored in the data memory 88.

Program memory 90 includes:
 a program 76 for transmitting 56 the ultrasound signal,
 a program 78 for measuring, 58, a representative response echo $ER_{11}$
 a program 80 for comparing 60 said representative response echo measured with the representative standard echo $EE_{11}$,
 a program 82 for determining, 62, the presence or absence of water in the buoy depending on the results of said comparison.

Obviously, the present invention is not limited to the examples described and illustrated, but is capable of numerous variants accessible to persons skilled in the art.

The invention claimed is:
1. A method for detection of water in a tensioning buoy of a riser of installations in a marine environment, said method comprising successive steps of:
 defining a representative standard echo;
 transmitting an ultrasound signal onto a wall of said buoy;
 measuring a representative response echo resulting from rebound of said ultrasound signal within said buoy;
 comparing said representative response echo with said representative standard echo; and
 determining a presence or absence of said water in said buoy depending on the results of said comparison;
 wherein said measuring said representative echo comprises:
  measuring a series of response echoes, then
  selecting said response echo corresponding to said representative standard echo.

2. The method according to claim 1, wherein said comparison of said representative response echo with said representative standard echo includes calculating their difference in amplitude.

3. A method for detection of water in a tensioning buoy of a riser of installations in a marine environment, said method comprising successive steps of:
- defining a representative standard echo; transmitting an ultrasound signal onto a wall of said buoy;
- measuring a representative response echo resulting from rebound of said ultrasound signal within said buoy;
- comparing said representative response echo with said representative standard echo; and
- determining a presence or absence of said water in said buoy depending on the results of said comparison;
- wherein said determining said presence or absence of said water in said buoy includes comparing a calculated difference in amplitude with a predefined threshold; and
  - if said difference in said amplitude does not exceed said threshold, concluding that said buoy does not contain said water; or
  - if said difference in said amplitude exceeds said threshold, concluding that said buoy does contain said water.

4. The method according to claim 3, wherein said threshold is 5 dB.

5. The method according to claim 1, wherein said step of defining said representative standard echo comprises:
- transmitting an ultrasound signal to a wall of a benchmark buoy filled with said water, at a given location in said wall; then
- measuring a first series of standard echoes; and
- transmitting the same said ultrasound signal to said wall of said benchmark buoy filled with air, at the same location on said wall; then
- measuring a second series of standard echoes; then
- calculating the difference between each said standard echo in said first series and each corresponding standard echo of said second series; then
- selecting a pair of standard echoes having a largest difference; and
- selecting one of the two echoes of said pair of standard echoes.

6. The method according to claim 5, wherein said selection of said pair of standard echoes having the greatest difference is performed on pairs of standard echoes beyond the second one and below the twenty-first one.

7. The method according to claim 1, wherein said step of said defining said representative standard echo is performed using numerical simulation and/or testing on a representative model.

8. The method according to claim 1, wherein said transmission of said ultrasound signals and said echo measurements are performed by a transducer.

9. An apparatus for detecting water in a tensioning buoy of a riser of a marine installation, said apparatus comprising:
(a) a human-machine interface;
(b) an ultrasound transducer applied to a wall of said buoy, said transducer transmitting an ultrasound signal and measuring a representative response echo caused by rebound of said signal within said buoy corresponding to a predetermined representative standard echo;
(c) a data memory that stores said predetermined representative standard echo and said representative response echo measured by said transducer;
(d) a program memory including:
- a program for transmitting said ultrasound signal;
- a program for measuring said response echo;
- a program for comparing an amplitude of said representative response echo with said representative standard echo;
- a program for determining presence or absence of said water in said buoy dependent on a result of said comparison; and
(e) a computer for controlling said human-machine interface, said transducer and said data and program memories.

* * * * *